(12) United States Patent
Schommer et al.

(10) Patent No.: US 9,134,120 B2
(45) Date of Patent: Sep. 15, 2015

(54) METHOD FOR ADJUSTING OR CALIBRATING A VEHICLE SURROUNDING SENSOR, AND A VEHICLE SURROUNDING SENSOR ADJUSTMENT OR CALIBRATION SYSTEM

(75) Inventors: Stefan Schommer, Unterschleissheim (DE); Adriano Macchia, Munich (DE); Christian Wagmann, Munich (DE); Jochen Backes, Munich (DE); Stefan Markus Kaefer, Aschheim (DE)

(73) Assignee: Robert Bosch GmbH, Stuttgart (DE)

( * ) Notice: Subject to any disclaimer, the term of this patent is extended or adjusted under 35 U.S.C. 154(b) by 293 days.

(21) Appl. No.: 12/812,842

(22) PCT Filed: Aug. 26, 2009

(86) PCT No.: PCT/EP2009/061006
§ 371 (c)(1),
(2), (4) Date: Jul. 14, 2010

(87) PCT Pub. No.: WO2010/028952
PCT Pub. Date: Mar. 18, 2010

(65) Prior Publication Data
US 2010/0318307 A1      Dec. 16, 2010

(30) Foreign Application Priority Data
Sep. 12, 2008   (DE) .......................... 10 2008 042 018

(51) Int. Cl.
G01D 18/00   (2006.01)
G01B 11/27   (2006.01)
G01S 7/40    (2006.01)
G01S 7/497   (2006.01)
G01S 7/52    (2006.01)
G01S 13/93   (2006.01)
(Continued)

(52) U.S. Cl.
CPC . *G01B 11/27* (2013.01); *G01S 7/40* (2013.01); *G01S 7/497* (2013.01); *G01S 7/52004* (2013.01); *G01S 13/931* (2013.01); *G01S 15/931* (2013.01); *G01S 17/936* (2013.01); *G01S 2013/9375* (2013.01)

(58) Field of Classification Search
CPC .................................. G01S 7/40; G01B 11/27
USPC ........ 702/104, 85, 94, 95, 150, 151; 382/141, 382/151; 701/300, 301
See application file for complete search history.

(56) References Cited

U.S. PATENT DOCUMENTS 4,745,469 A * 5/1988 Waldecker et al. ............. 348/94
5,654,715 A * 8/1997 Hayashikura et al. .......... 342/70
(Continued)

FOREIGN PATENT DOCUMENTS

WO    2004/027347    4/2004

*Primary Examiner* — Sujoy Kundu
*Assistant Examiner* — Ricky Ngon
(74) *Attorney, Agent, or Firm* — Michael J. Striker

(57) ABSTRACT

A method for calibrating a vehicle surroundings sensor (15) includes the steps of attaching at least one target pair (20, 22) to the rear wheels (12, 14) of a motor vehicle (7); recording the target pair (20, 22) using at least one measuring unit (32, 46) and determining the vehicle axis (64) from the recording; placing a target (16, 18) in a known position relative to a vehicle surroundings sensor adjustment or calibration element (62); fastening at least one measuring unit (32, 46) by means of fastening adapters (34, 48) to a running rail (4, 6); recording the target (18) placed on the vehicle surroundings sensor adjustment and determining the angular position of the vehicle surroundings sensor adjustment or calibration element (62) relative to the vehicle axis (64); aligning the vehicle surroundings sensor adjustment or calibration element (62) relative to the vehicle axis (64); and adjusting the vehicle surroundings sensor (15) relative to the vehicle axis (64).

11 Claims, 3 Drawing Sheets

(51) Int. Cl.
  *G01S 15/93* (2006.01)
  *G01S 17/93* (2006.01)

(56) References Cited

U.S. PATENT DOCUMENTS

| | | | |
|---|---|---|---|
| 5,675,515 A * | 10/1997 | January | 700/279 |
| 5,724,743 A * | 3/1998 | Jackson | 33/288 |
| 5,760,938 A * | 6/1998 | Hodge | 359/641 |
| 6,363,619 B1 * | 4/2002 | Schirmer et al. | 33/288 |
| 6,778,928 B2 * | 8/2004 | Stiller | 702/104 |
| 6,823,601 B2 * | 11/2004 | Murray | 33/288 |
| 7,121,011 B2 * | 10/2006 | Murray et al. | 33/288 |
| 2002/0080343 A1 * | 6/2002 | Bux et al. | 356/139.09 |
| 2005/0041847 A1 * | 2/2005 | Dorrance et al. | 382/141 |
| 2006/0279728 A1 * | 12/2006 | Dorrance et al. | 356/139.03 |
| 2009/0222229 A1 * | 9/2009 | Kakinami | 702/97 |

* cited by examiner

METHOD FOR ADJUSTING OR CALIBRATING A VEHICLE SURROUNDING SENSOR, AND A VEHICLE SURROUNDING SENSOR ADJUSTMENT OR CALIBRATION SYSTEM

CROSS-REFERENCE

The invention described and claimed hereinbelow is also described in PCT/EP2009/061006, filed on Aug. 26, 2009 and DE 10 2008 042 018.2, filed on Sep. 12, 2008. This German Patent Application, whose subject matter is incorporated here by reference, provides the basis for a claim of priority of invention under 35 U.S.C. 119 (a)-(d).

BACKGROUND OF THE INVENTION

The present invention relates to a method for adjusting or calibrating a vehicle surroundings sensor, and to a vehicle surroundings sensor adjustment or calibration system.

"Driving assistance systems", which monitor the vehicle surroundings and deliver related information to the driver, are being used in an increasing number of motor vehicles. Many systems even actively intervene in the vehicle operation and automatically brake or accelerate the vehicle. Other systems monitor e.g. the vehicle position relative to the road using markings on the road. As soon as the vehicle approaches the edge of the road, this can be communicated to the driver acoustically and/or visually.

These driving assistance systems must be aligned at least relative to the axis of the motor vehicle. Therefore, they must be calibrated or adjusted at certain intervals of time. This type of calibration or adjustment of driving assistance systems is highly complex and results in high additional costs for the equipment required for this purpose.

SUMMARY OF THE INVENTION

Therefore, an object of the present invention is to provide a vehicle surroundings adjustment or calibration system and a related method for adjusting or calibrating a vehicle surroundings sensor that makes it possible to perform a calibration or adjustment of this type in a simple and cost-effective manner.

Using the method, according to the invention, for adjusting or calibrating a vehicle surroundings sensor according to the independent method claim, and using the vehicle surroundings sensor adjustment or calibration system according to the independent device claim, the targets and the measuring units of the chassis measuring device are used to determine the position of the vehicle surroundings sensor adjustment or calibration element and, therefore, of the vehicle surroundings sensor relative to the driving axis and, based thereon, the vehicle surroundings sensor can be adjusted or calibrated.

The driving axis is determined by the position of the wheels on the rear axle, and can deviate from the longitudinal midplane of the motor vehicle.

According to the invention, common targets can be used to adjust or calibrate the vehicle surroundings sensor. To "adjust" is understood to mean adjusting the vehicle surroundings sensor itself, and to "calibrate" is understood to mean the computation-based compensation of measured values ascertained using the vehicle surroundings sensor.

The adjustment or calibration, according to the invention, of a vehicle surroundings sensor is easy to perform, and even unknown targets can be used, that is, targets that do not have a known configuration of control points.

According to the invention, all vehicle surroundings sensors located on or in the motor vehicle can be adjusted or calibrated. The vehicle surroundings sensors to be adjusted or calibrated according to the invention can be e.g. optical, radar-based, or ultrasound-based vehicle surroundings sensors.

The method, according to the invention, for adjusting or calibrating a vehicle surroundings sensor, and the vehicle surroundings sensor adjustment or calibration system according to the invention do not require any additional measuring elements or, in particular, any electronics on the adjustment or calibration device, thereby reducing costs considerably.

Compared to chassis measuring devices having CCD (Charge-Coupled Device) technology, the further advantages results that additional electronics on the adjustment or calibration device, and the associated cables, can be eliminated, and it is possible to check the vehicle surroundings sensors even across long distances, thereby eliminating the restriction that the distances between the measuring elements on the motor vehicle and the measuring elements on the adjustment or calibration device be short.

Compared to 3D chassis measuring device that are permanently installed in front of the measurement station, the advantages result that no additional cameras are required on the adjustment or calibration device, and that the distance between the adjustment or calibration device and the motor vehicle need not be determined manually e.g. using a tape measure.

In summary, the method, according to the invention, for adjusting or calibrating a vehicle surroundings sensor is therefore easy to carry out, and the adjustment or calibration system according to the invention is easy to operate and is cost effective.

According to an advantageous embodiment in which the distance of the vehicle surroundings sensor adjustment or calibration element to the front axle is also determined, a dynamic distance measurement is made possible, and a manual measurement of distance between the adjustment and calibration device and the motor vehicle is eliminated, which often must be carried out when using chassis measuring devices having CCD technology, in which conventional units must be adapted to the vehicle wheel using clamping units.

The advantageous developments of the vehicle surroundings sensor adjustment or calibration system, and the further resultant advantages that are described below also result in a similar manner for the method, according to the invention, for adjusting or calibrating a vehicle surroundings sensor, and these are to be explicitly considered to also be disclosed. To prevent repetition, these method-based developments and the associated advantages will not be repeated.

BRIEF DESCRIPTION OF THE DRAWINGS

The present invention is explained in the following in greater detail using embodiments, with reference to the attached FIGS. 1 through 3.

DETAILED DESCRIPTION OF THE PREFERRED EMBODIMENTS

Figure 1:
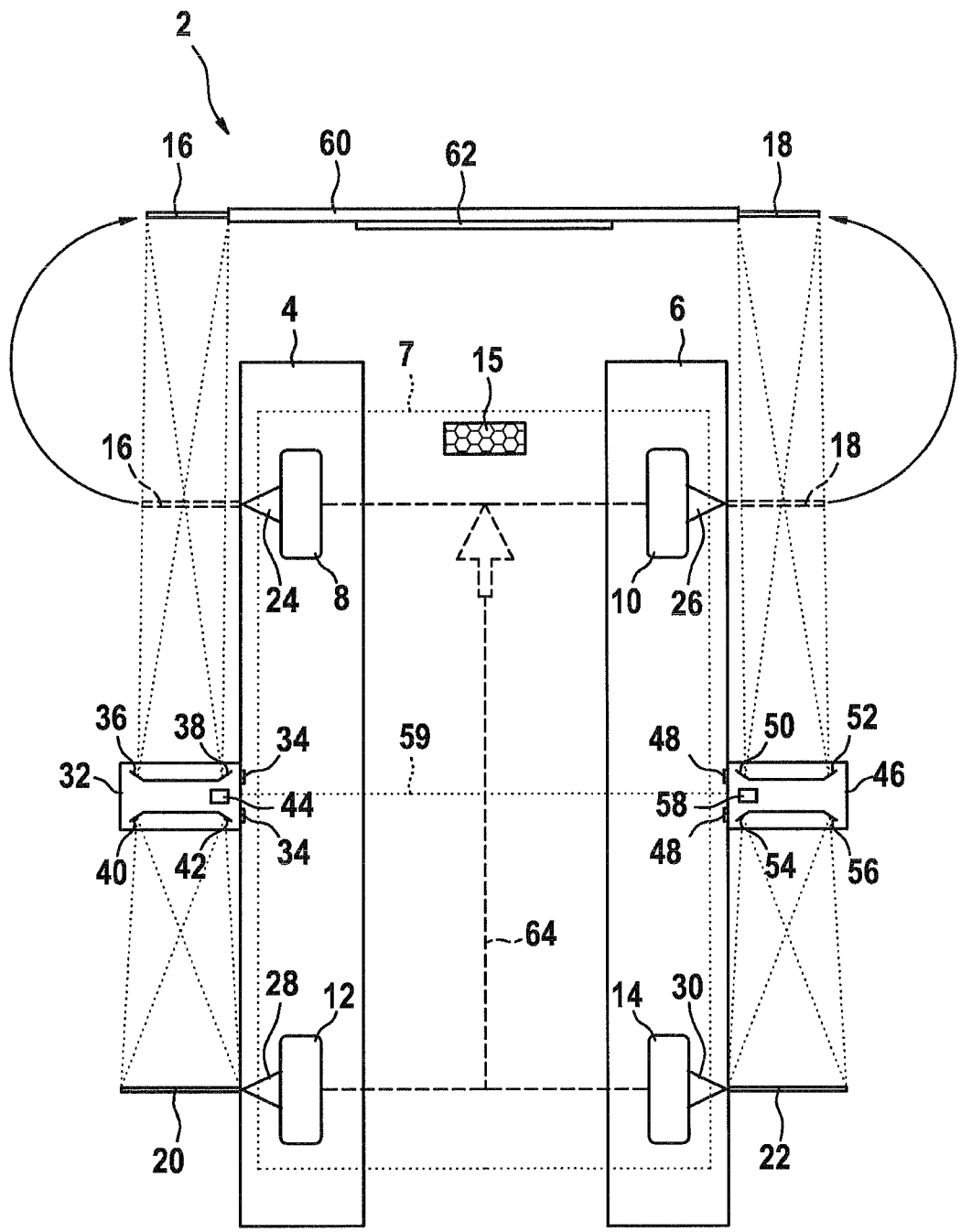
FIG. 1 shows a schematic diagram of a first vehicle surroundings sensor adjustment or calibration system according to an embodiment of the invention.

FIG. 1 shows a schematic diagram of a first vehicle surroundings sensor adjustment or calibration system 2.

First vehicle surroundings sensor adjustment or calibration system 2 includes a motor vehicle 7 that is situated on running rails 4 and 6 of a measurement station having a chassis measuring device. To simplify the depiction, only wheels 8, 10, 12 and 14 of vehicle 7 are shown, and the dimensions of the body of vehicle 7 are indicated merely using a dotted outline. The front axle and rear axle of motor vehicle 7 are indicated using dashed transverse lines. Geometric driving axis 64 is shown as a dashed arrow that extends from the center point of the rear axle to the center point of the front axle. Approximately in the center of its front side, the motor vehicle includes a vehicle surroundings sensor 15 that should be adjusted or calibrated using first vehicle surroundings sensor adjustment or calibration system 2.

Chassis measuring device includes targets 16, 18, 20 and 22 that are fastened to wheels 8, 10, 12 and 14 of motor vehicle 7 using quick clamping units 24, 26, 28 and 30, and a left measuring unit 32 and a right measuring unit 46 that are fastened to running rails 4 and 6 using fastening adapters 34 and 48 approximately in the center relative to the longitudinal extension of running rails 4 and 6, and extend outwardly therefrom. Targets 16 through 22 are disk-shaped in design and point outwardly. The main direction of extension of targets 16 through 22 can extend in a perpendicular plane through the rotational axis of wheels 8 and 10, and 12 and 14, as shown in FIG. 1 as an example.

Left measuring unit 32 includes an outer, forward-pointing measurement camera 36, an inner, forward-pointing measurement camera 38, an outer, rearward-pointing measurement camera 40, and an inner, rearward-pointing measurement camera 42. In a similar manner, right measuring unit 46 includes an inner, forward-pointing measurement camera 50, an outer, forward-pointing measurement camera 52, an inner, rearward-pointing measurement camera 54, and an outer, rearward-pointing measurement camera 56. The field of vision of rearward-pointing measurement cameras 40 and 42 of left measuring unit 32, and the field of vision of rearward-pointing measurement cameras 54 and 56 are each dimensioned such that they fully encompass left rear target 20 and right rear target 22.

Measuring units 32 and 46 shown in FIG. 1 are mobile measuring units that are hung on running rails 4 and 6 using fastening adapters 34 and 52, or are screwed together with running rails 4 and 6. A magnet adaption is likewise possible. Basically, measuring units 32 and 46 can be connected to running rails 4 and 6 in any suitable manner. The advantage of providing detachable connections is that measuring units 32 and 46 can be easily removed and used at other workstations.

Measuring units 32 and 46 include cross-referencing that, in the figure, is embodied as cross-reference cameras 44 and 58 that point in the transverse direction of the vehicle and detect optical features on the particular opposite running rail or measurement units 32 and 46 to thereby determine the position of measuring units 32 and 46 relative to each other. For example, the optical features can be designed as LEDs on diametrically opposed cross-reference cameras 44 and 58. Cross-reference cameras 44 and 58 are disposed above or below running rails 4 and 6, but definitely underneath the bottom of motor vehicle 7, such that the transverse line of sight is unrestricted.

Furthermore, measuring units 32 and 46 can also include tilt sensors, which are not depicted here, and which are used to determine the tilt of measuring units 32 and 46. The line of sight used for cross referencing between transverse reference cameras 44 and 58 is depicted in FIG. 1 using a dotted transverse line.

Targets 16 and 18 are shown as dashed lines on front wheels 8 and 10.

A frame 60 is disposed in front of the measurement station, which is oriented transversely to the vehicle and extends from a width position left of left running rail 4 to a width position right of right running rail 6. Receptacles, which are not shown in FIG. 1, are disposed on the lateral ends of frame 60, into which targets 16 and 18 of front wheels 8 and 10 can be inserted.

Two arrows are used in FIG. 1 to show how targets 16 and 18 of front wheels 8 and 10 are removed therefrom and are attached to lateral receptacles in frame 60.

A vehicle surroundings sensor adjustment or calibration target 62 is disposed on rearward-pointing side of frame 60, which extends approximately from a width position that corresponds to the right end of left running rail 4, to a width position that corresponds to the left end of right running rail 6.

The focal distance of forward-pointing measurement cameras 36 and 38 of left measuring unit 32, and the focal distance of forward-pointing measurement cameras 50 and 52 of right measuring unit 46 can each be changed such that targets 16 and 18 attached to front wheels 8 and 10 are located entirely within their field of vision, and such that targets 16 and 18 disposed in lateral receptacles of frame 60 are located entirely within their field of vision, as indicated in FIG. 1 using dotted lines.

Figure 2:
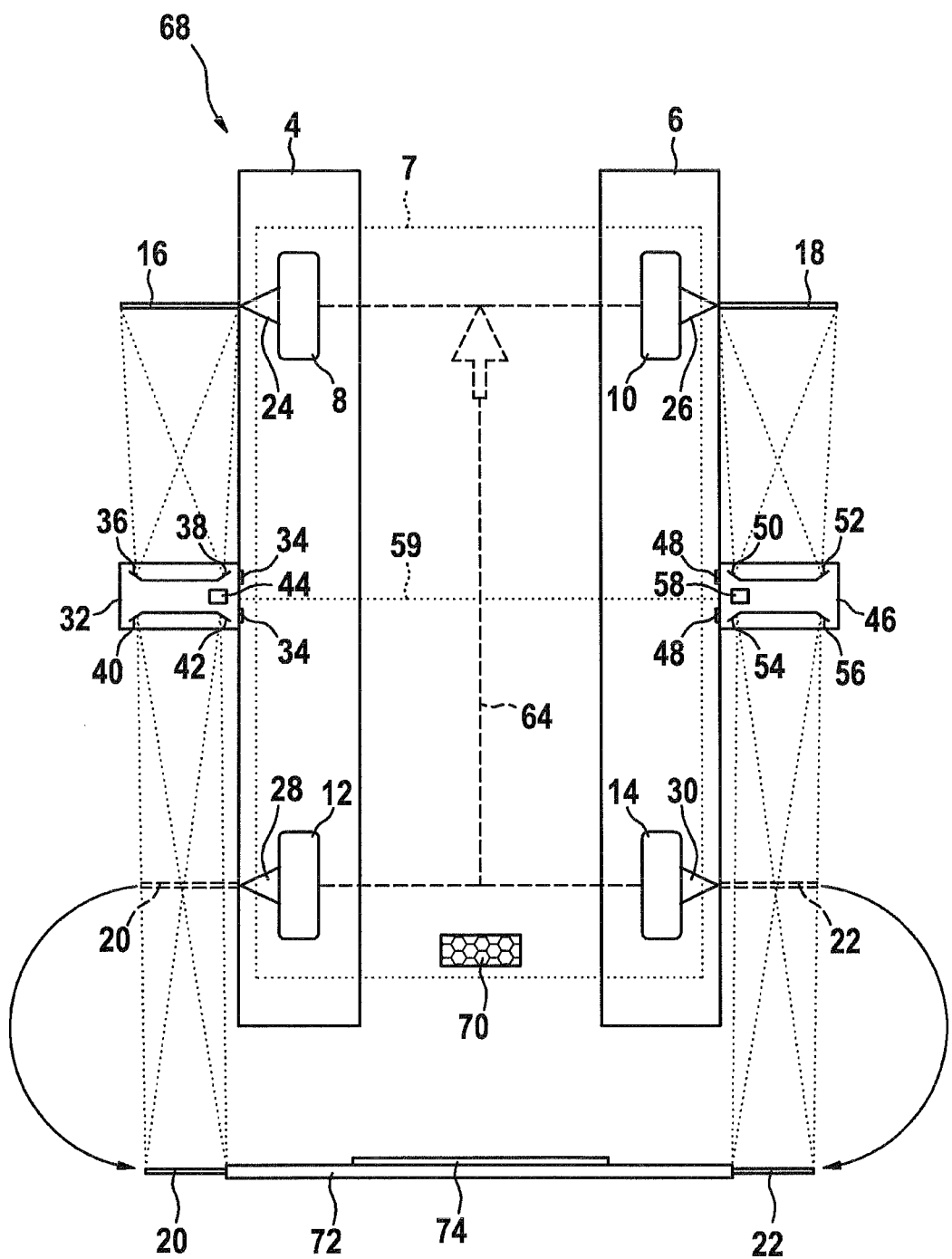
FIG. 2 shows a second vehicle surroundings sensor adjustment or calibration system according to a second embodiment of the invention.
Figure 3:
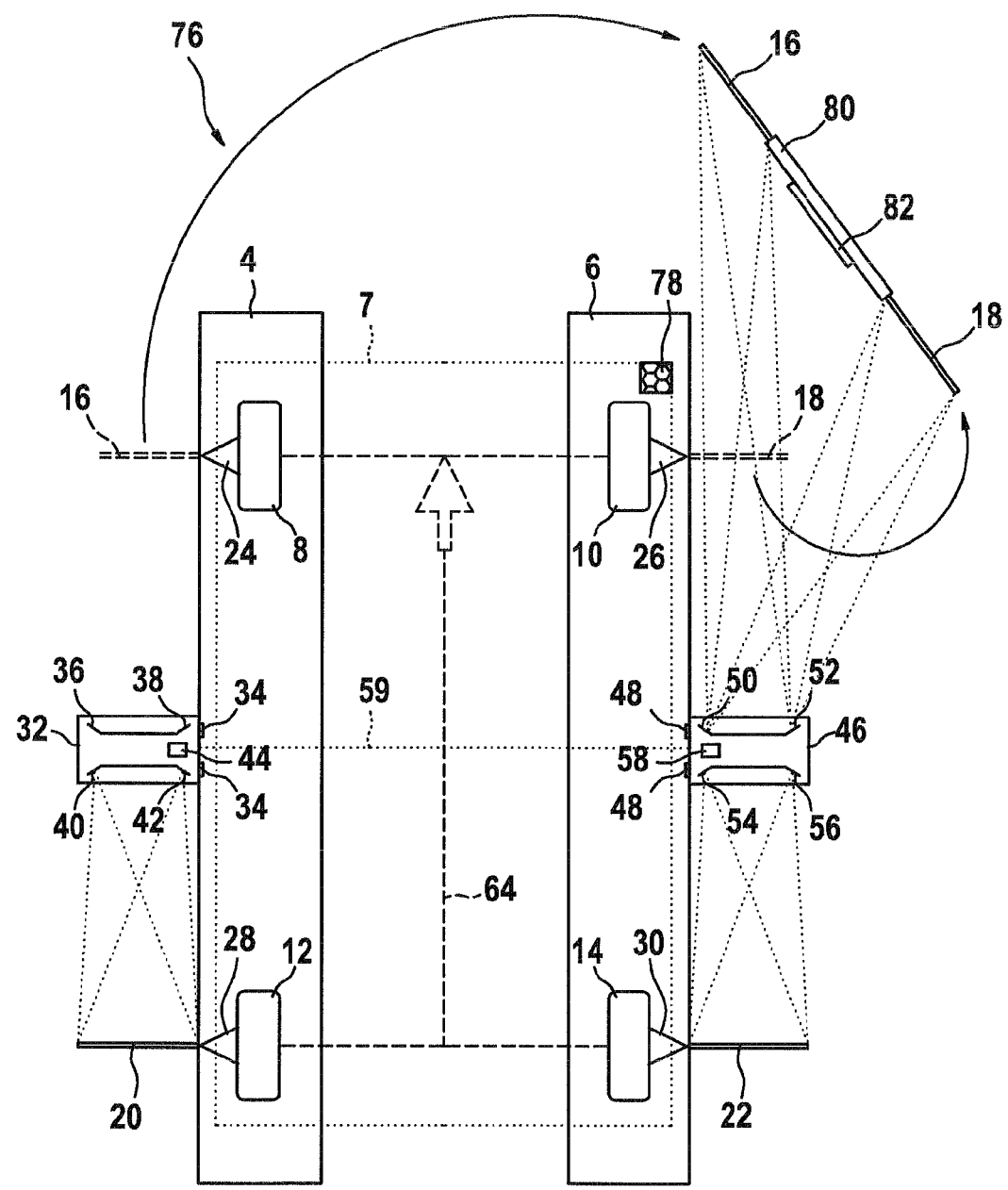
FIG. 3 shows a schematic diagram of a third vehicle surroundings sensor adjustment or calibration system according to a third embodiment of the invention.

The vehicle surroundings sensor adjustment or calibration systems shown in FIGS. 1 through 3 also include a not-shown data processing unit or evaluation unit that receive signals from the measurement cameras or the reference cameras and the vehicle surroundings sensor and determine the relevant chassis parameters on the basis of these signals.

FIG. 2 shows a second vehicle surroundings sensor adjustment or calibration system 68.

Second vehicle surroundings sensor adjustment or calibration system 68 differs from first vehicle surroundings sensor adjustment or calibration system 2 in that the vehicle surroundings sensor is disposed in the center of rear end of motor vehicle 7, frame 72 having forward-pointing vehicle surroundings sensor adjustment or calibration target 74 is disposed behind motor vehicle 7, and rear targets 20 and 22 are moved from the position on rear wheels 12 and 14 indicated using dashed lines to the lateral receptacles in frame 72.

Accordingly, the fields of view of forward-pointing cameras 36 and 38 of left measuring unit 32, and forward-pointing cameras 50 and 52 of right measuring unit 46 are dimensioned such that they fully encompass front targets 16 and 18. The focal distances of rearward-pointing cameras 40 and 42 of left measuring unit 32, and of rearward-pointing cameras 54 and 56 of right measuring unit 46 can be adjusted such that rear targets 20 and 22 are located entirely within the field of vision of cameras 40, 42, 54 and 56 when they are attached to rear wheels 12 and 14, and when they are attached to the lateral receptacles in frame 72.

FIG. 3 shows a schematic diagram of a third vehicle surroundings sensor adjustment or calibration system 76.

Third vehicle surroundings sensor adjustment or calibration system 76 differs from first vehicle surroundings sensor adjustment or calibration system 2 in that vehicle surroundings sensor 78 is placed in a right front corner region of motor vehicle 7, frame 80 and vehicle surroundings sensor adjustment or calibration target 82 located on its front side is designed slightly smaller than in FIG. 1, and frame 80 and target 82 are disposed in a position to the right in front of motor vehicle 7 having an oblique orientation.

Arrows are likewise used in FIG. 3 to indicate how the positions of front targets 16 and 18 are switched between front wheels 8 and 10, and the lateral receptacles in frame 80. There is no line of sight between forward-pointing cameras 36 and 38 of left measuring unit 32 and front left target 16 disposed in left receptacle in frame 80 since there is a motor vehicle 7 disposed therebetween. However, targets 16 and 18 that are placed on frame 80 are located in the field of vision of forward-pointing cameras 50 and 52 of right measuring unit 46. To this end, the focal distance and field of vision of cameras 50 and 52 can be changed such that right front target 18 disposed on right front wheel 10 is situated entirely in its field of vision, and targets 16 and 18 disposed in lateral receptacles in frame 80 are situated entirely in their fields of view.

The method for adjusting or calibrating vehicle surroundings sensor 15 of motor vehicle 7 is explained below in detail:

Using clamping units 24 through 30, targets 16 and 18 are fastened to front wheels 8 and 10, and targets 20 and 22 are fastened to rear wheels 12 and 14 of motor vehicle 7, wherein, in the simplest embodiment, it is sufficient to only attach targets 20 and 22 to rear wheels 12 and 14 of motor vehicle 7 because this enables the geometric driving axis of motor vehicle 7 to be determined very accurately.

Measuring units 32 and 46 are then fastened to running rails 4 and 6 using fastening adapters 34 and 48, if they are not already located there.

Next, targets 16 and 18 are recorded by forward-pointing measurement cameras 34, 36, and 50 and 52, and rear targets 20 and 22 are recorded by rearward-pointing measurement cameras 40, 42 and 54, 56. Targets 16, 18, 20 and 22 are then rotated into a second target position, either by displacing the motor vehicle on running rails 4 and 6, or by rotating targets 16 through 22 relative to wheels 8 through 14 which remain fixed in position. Targets 16 through 22 are now recorded once more by measurement cameras 36 through 42 and 50 through 56. On the basis of these recorded images of targets 16 through 22, the data processing unit can now determine vehicle axis 64, and it is sufficient to consider targets 20 and 22 on rear wheels 12 and 14, as mentioned previously.

Next, front targets 16 and 18 are removed from front wheels 8 and 10, and are attached to lateral receptacles in frame 60. Targets 16 and 18 on frame 60 are then recorded once more by forward-pointing cameras 36 and 38, and 50 and 52; targets 16 and 18 are then rotated on the frame, and an image of targets 16 and 18 is then captured again by cameras 36, 38 and 50, 52 in the second rotated target position.

The data processing unit can now determine the angular position of vehicle surroundings sensor adjustment or calibration element 62 relative to vehicle axis 64.

Vehicle surroundings sensor adjustment or calibration element 62 can then be aligned relative to vehicle axis 64 and, in a subsequent step, it can be adjusted or calibrated.

If the distance of targets 16 and 18 to measuring units 32 and 46 and, therefore, to the front axle of the motor vehicle, is also determined, the data processing unit can also determine the position of vehicle surroundings sensor adjustment or calibration element 62 relative to front axle 64 of motor vehicle 7, and, in fact, on the basis of vehicle axis 64 that was determined and the distance of targets 16 and 18 to motor vehicle 7 that was determined, and on the basis of the angular position, that was determined, of vehicle surroundings sensor adjustment or calibration element 62 relative to vehicle axis 64.

The method for adjusting or calibrating vehicle surroundings sensor 70 of second vehicle surroundings sensor adjustment or calibration system 68 proceeds analogously, except that, in this case, rear targets 20 and 22 are removed from rear wheels 12 and 14 and are attached to lateral recesses in frame 72 disposed behind motor vehicle 7, and that targets 20 and 22 are recorded in two target positions by rearward-pointing cameras 40 and 42, and 54 and 56.

The method for adjusting or calibrating vehicle surroundings sensor 78 likewise proceeds analogously to the method for adjustment or calibrating vehicle surroundings sensor 15 of first vehicle surroundings sensor adjustment or calibration system 2, although in this case targets 16 and 18 disposed in lateral recesses in frame 80 are each recorded in two target positions by forward-pointing measurement cameras 50 and 52 of right measuring unit 46.

What is claimed is:

1. A method for adjusting or calibrating a vehicle surroundings sensor, comprising the following steps:
   fastening at least one measuring unit by means of fastening adapters to a running rail in a position between a front wheel and a rear wheel of the vehicle, wherein the at least one measuring unit includes at least two measuring cameras with reverse viewing direction, whereby at least one measuring camera has a forward viewing direction and at least one camera has a backward viewing direction, wherein the at least one measuring unit includes cross referencing for determining a position of one of the at least one measuring unit relative to a position of another one of the at least one measuring unit, wherein said cross referencing comprises cross-reference cameras that are directed in a transverse direction of the vehicle and detect optical features that are oppositely disposed on the at least one measuring unit;
   attaching at least one target pair to rear wheels of a motor vehicle;
   recording the target pair using said at least one measuring unit and determining the vehicle axis from the recording;
   placing at least one target in a known position relative to a vehicle surroundings sensor adjustment or calibration element;
   recording the target placed on the vehicle surroundings sensor adjustment or calibration element using the at least one measuring unit and determining the angular position of the vehicle surroundings sensor adjustment or calibration element relative to the vehicle axis;
   aligning the vehicle surroundings sensor adjustment or calibration element relative to the vehicle axis; and
   adjusting or calibrating the vehicle surroundings sensor relative to the vehicle axis.

2. The method according to claim 1, furthermore comprising the steps of attaching a target pair to the front wheels of the motor vehicle, recording the target pairs on the front wheels and the rear wheels using the at least one measuring unit, and determining the vehicle axis based on the recording.

3. The method according to claim 1, furthermore comprising the step of determining the distance from the vehicle surroundings sensor adjustment or calibration element to the front axle.

4. A vehicle surroundings sensor adjustment or calibration arrangement comprising:
   a target pair on the rear wheels of a motor vehicle;
   a vehicle surroundings sensor;
   a vehicle surroundings sensor adjustment or calibration element in front of or behind the motor vehicle;

at least one adapter for placing a target in a known position relative to the vehicle surroundings sensor adjustment or calibration element;

at least one measuring unit for detecting the targets, wherein said at least one measuring unit is fastened to a running rail via fastening adapters in a position between a front wheel and a rear wheel of the vehicle, wherein the at least one measuring unit includes at least two measuring cameras with reverse viewing direction, whereby at least one measuring camera has a forward viewing direction and at least one camera has a backward viewing direction, wherein the at least one measuring unit includes cross referencing for determining a position of one of the at least one measuring unit relative to a position of another one of the at least one measuring unit, wherein said cross referencing comprises cross-reference cameras that are directed in a transverse direction of the vehicle and detect optical features that are oppositely disposed on the at least one measuring unit; and a data processing unit configured to calculate, on the basis of the recorded images of the targets, the vehicle axis of the motor vehicle; and determine the angular position of the vehicle surroundings sensor adjustment or calibration element relative to the vehicle axis.

5. The vehicle surroundings sensor adjustment or calibration arrangement according to claim 4, wherein the data processing unit is furthermore designed to adjust or calibrate the vehicle surroundings sensor relative to the vehicle axis after the vehicle surroundings sensor adjustment or calibration element has been aligned relative to the vehicle axis.

6. The vehicle surroundings sensor adjustment or calibration arrangement according to claim 4, furthermore comprising a target pair on the front wheels and the motor vehicle.

7. The vehicle surroundings sensor adjustment or calibration arrangement according to claim 4, wherein the data processing unit is furthermore designed to determine the distance from the vehicle surroundings sensor adjustment or calibration element to the front axle.

8. The vehicle surroundings sensor adjustment or calibration arrangement according to claim 4, wherein the vehicle surroundings sensor adjustment or calibration element is disposed on a frame in front of or behind the motor vehicle.

9. The vehicle surroundings sensor adjustment or calibration arrangement according to claim 8, wherein the frame includes at least one laterally disposed adapter receptacle for a target.

10. The vehicle surroundings sensor adjustment or calibration arrangement according to claim 4, wherein the measuring units reference each other to determine the position of the measuring units.

11. A vehicle surroundings sensor adjustment or calibration arrangement comprising:

a target pair on the rear wheels of a motor vehicle;

a vehicle surroundings sensor;

a vehicle surroundings sensor adjustment or calibration element in front of or behind the motor vehicle;

at least one adapter for placing a target in a known position relative to the vehicle surroundings sensor adjustment or calibration element;

a left measuring unit and a right measuring unit fastened via fastening adapters to a left running rail and a right running rail, respectively, in positions between front wheel and rear wheels of the vehicle, configured for detecting the targets and including at least two measuring cameras with reverse viewing direction, wherein at least one measuring camera has a forward viewing direction and at least one camera has a backward viewing direction, wherein the left and right measuring units include cross referencing for determining a position of the left measuring unit relative to a position of right measuring unit, and wherein said cross referencing comprises cross-reference cameras that are directed in a transverse direction of the vehicle and detect optical features that are oppositely disposed on the left and right measuring units; and a data processing unit configured to calculate, on the basis of the recorded images of the targets, the vehicle axis of the motor vehicle; and determine the angular position of the vehicle surroundings sensor adjustment or calibration element relative to the vehicle axis.

* * * * *